(12) United States Patent
Koyama et al.

(10) Patent No.: US 10,541,432 B2
(45) Date of Patent: Jan. 21, 2020

(54) FUEL GAS CIRCULATION APPARATUS

(71) Applicants: KEIHIN CORPORATION, Tokyo (JP); HONDA MOTOR CO., LTD., Tokyo (JP)

(72) Inventors: Tomoyoshi Koyama, Utsunomiya (JP); Tetsuya Fukuda, Wako (JP); Satoshi Inoue, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 74 days.

(21) Appl. No.: 15/437,550

(22) Filed: Feb. 21, 2017

(65) Prior Publication Data
US 2017/0244116 A1    Aug. 24, 2017

(30) Foreign Application Priority Data

Feb. 24, 2016  (JP) ................................ 2016-032655

(51) Int. Cl.
*H01M 8/04089* (2016.01)
*H01M 8/04746* (2016.01)

(52) U.S. Cl.
CPC ... *H01M 8/04097* (2013.01); *H01M 8/04753* (2013.01)

(58) Field of Classification Search
CPC ................................. H01M 8/04097
See application file for complete search history.

(56) References Cited

U.S. PATENT DOCUMENTS

| 9,166,234 | B2 | 10/2015 | Takeyama |
| 2009/0317691 | A1 | 12/2009 | Yamada et al. |
| 2012/0189927 | A1* | 7/2012 | Kato ................. H01M 8/04097 429/415 |

FOREIGN PATENT DOCUMENTS

| JP | S58-122777 U | 8/1983 |
| JP | H03-108859 U | 11/1991 |
| JP | 2768522 B | 6/1998 |
| JP | H10-318095 A | 12/1998 |
| JP | 2008-196401 | 8/2008 |
| JP | 2010-267553 | 11/2010 |
| WO | 2013/001603 A1 | 1/2013 |

OTHER PUBLICATIONS

U.S. Appl. No. 15/437,550, filed Feb. 21, 2017 is co-pending with U.S. Appl. No. 15/437,540, filed Feb. 21, 2017 and U.S. Appl. No. 15/437,546, filed Feb. 21, 2017.
U.S. Final Office Action dated Jan. 3, 2019 from co-pending U.S. Appl. No. 15/437,546, 7 pages.
Japanese Office Action from corresponding JP Application No. 2016-032638 (issued in connection with co-pending U.S. Appl. No. 15/437,540) dated Nov. 26, 2019, with English Translation, 10 pages.

* cited by examiner

*Primary Examiner* — Ladan Mohaddes
(74) *Attorney, Agent, or Firm* — Rankin, Hill & Clark LLP

(57) ABSTRACT

In a fuel gas circulation apparatus, a diffuser is accommodated in an attachment hole of a body. An injector is provided upstream of the diffuser through an attachment. A vibration absorption member made of elastic material is provided between a proximal end of a large diameter portion of this diffuser and a distal end of a main body in the attachment, and a ring member is provided adjacent to the vibration absorption member.

2 Claims, 3 Drawing Sheets

FUEL GAS CIRCULATION APPARATUS

CROSS-REFERENCE TO RELATED APPLICATION

This application is based upon and claims the benefit of priority from Japanese Patent Application No. 2016-032655 filed on Feb. 24, 2016, the contents of which are incorporated herein by reference.

BACKGROUND OF THE INVENTION

Field of the Invention

The present invention relates to a fuel gas circulation apparatus used in a fuel cell system, for circulating a redundant fuel off gas which has not been consumed in a fuel cell stack.

Description of the Related Art

Conventionally, in fuel cell systems, fuel gas supply apparatuses for supplying a fuel gas have been used. For example, in a fuel gas supply apparatus disclosed in Japanese Laid-Open Patent Publication No. 2008-196401, a diffuser is formed at one end of a casing, and an injector for injecting a fuel gas is provided at a position upstream of the diffuser. Further, a tapered nozzle is provided at the distal end of the injector. Further, by injecting the fuel gas from the injector to the nozzle, a negative pressure is generated around the nozzle. Then, the fuel off gas in the circulation channel is sucked into the diffuser for mixing the fuel off gas with a fresh fuel gas, and the mixed gas is supplied toward the downstream side.

SUMMARY OF THE INVENTION

In the above described fuel gas supply apparatus, since the diffuser is formed inside the casing, the casing has complicated structure. It is difficult to produce the fuel gas supply apparatus, and the production cost is high disadvantageously. Further, since the injector is fixed to the casing directly, the vibrations generated during operation of the injector are transmitted directly to the casing, and thus, the casing may be damaged, or noises may be generated as a result of the vibrations.

A general object of the present invention is to provide a fuel gas circulation apparatus having simple structure in which it is possible to reduce transmission of vibrations from an injector to a body.

A fuel gas circulation apparatus of the present invention includes a body, a fuel gas supply channel formed in the body, and connected to a fuel cell, an off gas channel formed in an intermediate position of the fuel gas supply channel, and configured to allow an fuel gas discharged from the fuel cell to flow through the off gas channel, an injector configured to inject the fuel gas to the fuel gas supply channel, and a diffuser provided downstream of the injector in the fuel gas supply channel, and configured to mix the fuel gas injected from the injector with the fuel off gas.

An elastic member is provided at a connection part between the injector and the diffuser.

In the present invention, a fuel gas supply channel is formed to flow a fuel gas in a body of a fuel gas circulation apparatus. The fuel gas circulation apparatus includes an injector configured to inject the fuel gas, and a diffuser provided downstream of the injector in the fuel gas supply channel, and configured to mix the fuel gas injected from the injector with the fuel off gas. An elastic member is provided at a connection part between the injector and the injector and the diffuser.

Thus, with the simple structure of providing the elastic member, vibrations generated by operation of the injector at the time of injecting the fuel gas can be absorbed suitably. Transmission of the vibrations to the body or the diffuser is reduced. Consequently, it is possible to reduce generation of noises, damages, etc. resulting from vibrations in the fuel gas circulation apparatus.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
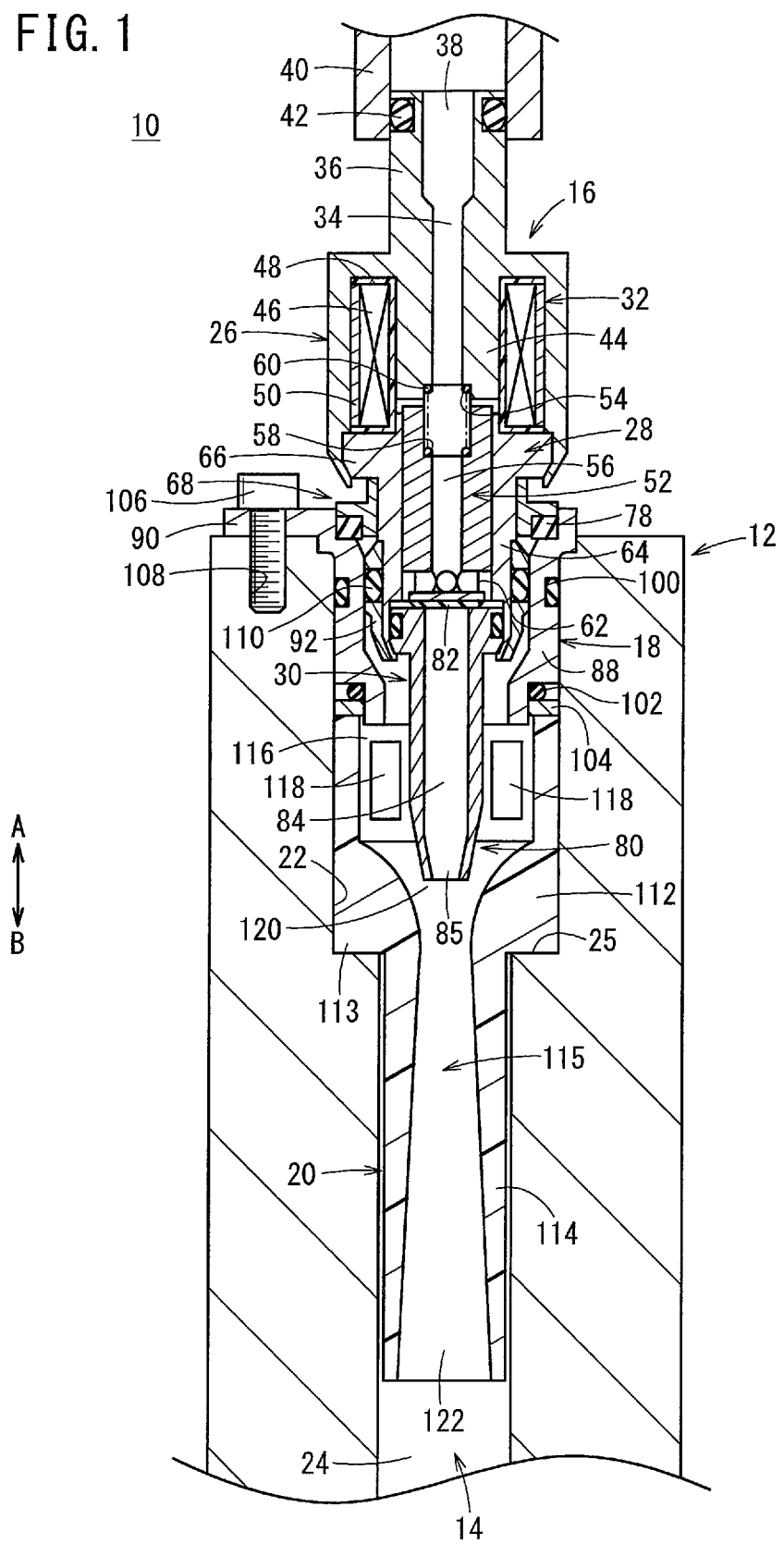
FIG. 1 is an overall cross sectional view showing a fuel gas circulation apparatus according to an embodiment of the present invention.

For example, a fuel gas circulation apparatus 10 is provided in a fuel cell system, between a fuel tank storing a fuel gas and a fuel cell stack. As shown in FIG. 1, the fuel gas circulation apparatus 10 includes an injector 16 provided at an attachment hole 14 of a body 12, for injecting the fuel gas, an attachment 18 for fixing the injector 16 to the body 12, and a diffuser 20 for mixing an off gas (fuel off gas) discharged from a fuel cell stack (not shown) with the fuel gas injected from the injector 16. The attachment hole 14 functions as a fuel gas supply channel to flow the fuel gas.

Hereinafter, a side of the fuel gas circulation apparatus 10 where the injector 16 is provided, indicated by an arrow A, will be referred to as the "proximal end side", and a side of the fuel gas circulation apparatus 10 where the diffuser 20 is provided, indicated by an arrow B, will be referred to as the "distal end side".

The attachment hole 14 includes a first hole 22 having a large diameter formed on the proximal end side of the body 12 indicated by the arrow A, a second hole 24 having a diameter smaller than that of the first hole 22, and formed on the distal end side of the body 12 indicated by the arrow B, and a stepped portion (stepped channel) 25 formed at the border between the first hole 22 and the second hole 24. An end of the second hole 24 is connected to the fuel cell stack (not shown) through a supply pipe.

The injector 16 includes a housing 26, a valve holder 28 provided on the distal end side of the housing 26 in the direction indicated by the arrow B for guiding a movable core 52 described later, and a fuel injection part 30 provided on the distal end side of the valve holder 28, for injecting the fuel gas. A solenoid part 32 is provided inside the housing 26, for driving the movable core 52.

For example, the housing 26 is made of metal. A gas channel 34 passes through the center of the housing 26 in an axial direction of the housing 26. The gas channel 34 is connected to an inlet port 38 of a connector part 36 formed on the proximal end side in the direction indicated by the arrow A. A pipe 40 is connected to the connector part 36. A fuel tank (not shown) is connected to the pipe 40 for supplying the fuel gas to the pipe 40. An O-ring 42 is attached to an annular groove formed on the outer circumferential surface of the connector part 36. Then, when the pipe 40 is fitted on the outer circumferential side of the connector part 36, leakage of the fuel gas is prevented by the O-ring 42.

Further, the diameter of the housing 26 is increased toward the distal end side (in the direction indicated by the arrow B) from an intermediate position in the axial direction, and the solenoid part 32 is provided inside the housing 26.

The solenoid part 32 includes a fixed core 44 provided at its center in alignment with the connector part 36, a bobbin 48 provided on an outer circumferential side of the fixed core 44 for holding a coil 46, and a cover member 50 provided around the bobbin 48 to cover the outer circumference side of the bobbin 48. The coil 46 is excited to move the movable core 52 positioned to face the distal end of the fixed core 44.

Further, the gas channel 34 passes through the connector part 36, up to the distal end of the fixed core 44, and a first spring receiver 54 is formed at the distal end of the gas channel 34. The diameter of the first spring receiver 54 is increased toward the outside in the radial direction.

Figure 2:
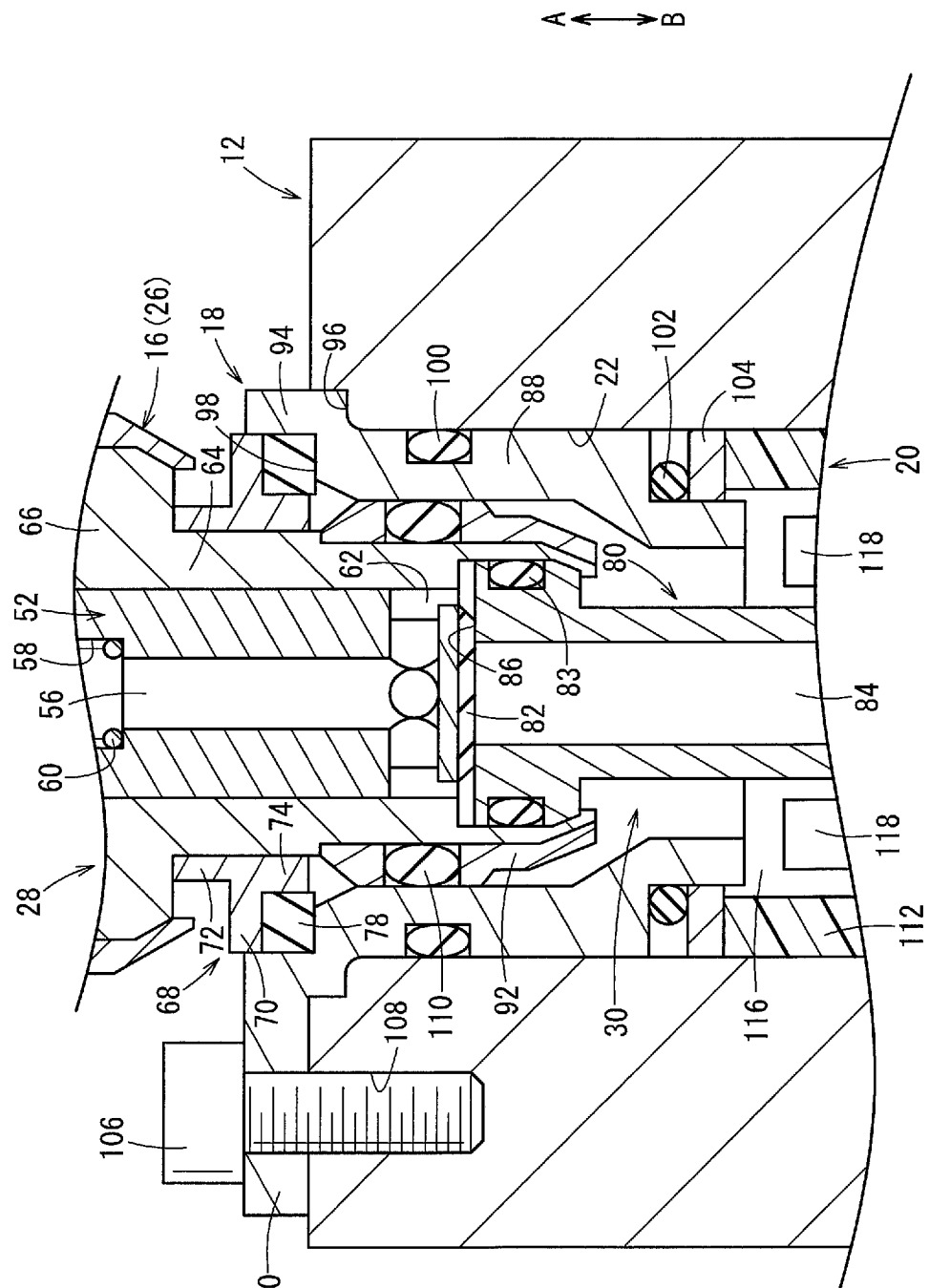
FIG. 2 is an enlarged cross sectional view showing an area around an attachment in the fuel gas circulation apparatus shown in FIG. 1.

As shown in FIGS. 1 and 2, for example, the movable core 52 is made of magnetic metal, and a passage hole 56 extends through the center of the movable core 52, from the proximal end to the distal end of the movable core 52. At the distal end, the passage hole 56 is opened outward radially, and passes through the movable core 52 to the outer circumferential surface.

A second spring receiver 58 is formed at the proximal end side of the passage hole 56 in the direction indicated by the arrow A. The diameter of the second spring receiver 58 is increased toward the outside in the radial direction. A spring 60 is interposed between the first spring receiver 54 of the fixed core 44 and the second spring receiver 58 of the movable core 52. The first spring receiver 54 and the second spring receiver 58 are positioned oppositely. For example, this spring 60 is a coil spring. The spring 60 applies its elastic force to the movable core 52 in a direction away from the fixed core 44, indicated by the arrow B.

The fuel gas is supplied from the inlet port 38 of the housing 26 to the gas channel 34. After the fuel gas flows through the fixed core 44 to the passage hole 56 of the movable core 52, the fuel gas flows into a space 62 formed outside (or on the outer circumferential side of) the distal end of the movable core 52. The space 62 is formed by partially cutting the outer circumferential portion of the movable core 52.

Further, the movable core 52 is sucked to move toward the fixed core 44 in the direction indicated by the arrow A, in opposition to the elastic force of the spring 60 under excitation operation of the coil 46 of the solenoid part 32.

For example, the valve holder 28 is made of metal, and includes a cylindrical guide 64, a flange 66 extending radially outward at the proximal end of the guide 64. The movable core 52 is provided movably at the center of the guide 64. The movable core 52 is movable in the axial directions indicated by the arrows A and B.

Further, the end surface of the flange 66 of the valve holder 28 contacts the end of the bobbin 48 of the solenoid part 32. The proximal end of the valve holder 28 is inserted into the bobbin 48. In this state, the valve holder 28 and the bobbin 48 are tightened together by (caulking) the distal end of the housing 26 extending to the outer circumferential surface of the flange 66. In this manner, the valve holder 28 is fixedly positioned coaxially with the distal end of the housing 26.

Further, the distal end of the guide 64 and a nozzle 80 of the fuel injection part 30 are tightened together (by caulking) in a manner that the nozzle 80 of the fuel injection part 30 is fixed coaxially with the guide 64.

A mounting member 68 is provided for the outer circumferential side of the valve holder 28 for fixing the injector 16 to the attachment 18 at the proximal end side adjacent to the flange 66 (in the direction indicated by the arrow A). As shown in FIGS. 1 and 2, the mounting member 68 is made of metal as a rigid body, and includes a base 70 having a C-shape in cross section, a first wall 72 oriented upright with respect to the base 70, and a second wall 74 oriented upright with respect to the base 70 in the direction indicated by the arrow B, oppositely to the first wall 72.

The first wall 72 is formed to protrude from one end surface of the base 70 in the axial direction indicated by the arrow A, and the end of the first wall 72 contacts the flange 66 of the valve holder 28. The second wall 74 protrudes from the other end surface of the base 70 in the axial direction indicated by the arrow B.

Further, an annular elastic member 78 is provided on the outer circumferential side of the second wall 74 of the mounting member 68. For example, this elastic member 78 is made of rubber, etc., and has a rectangular shape in cross section. The elastic member 78 is fixedly position in the state where the inner circumferential surface of the elastic member 78 contacts the outer circumferential surface of the second wall 74, the proximal end surface of the elastic member 78 contacts the end surface of the base 70.

The fuel injection part 30 includes the nozzle 80 provided at the distal end of the valve holder 28, and a valve plug 82 provided at the distal end of the movable core 52 for switching the state of fuel gas supply through the nozzle 80 (see FIG. 2).

For example, the nozzle 80 is made of metal, and has a cylindrical shape. The diameter at the proximal end of the nozzle 80 is increased, and the nozzle 80 is held by the valve holder 28. The distal end of the nozzle 80 is tapered to have a gradually reduced diameter. A nozzle hole 84 passes through the center of the nozzle 80 in the axial direction, and the nozzle hole 84 includes a nozzle injection hole 85 at a position adjacent to its distal end (see FIG. 1). The diameter of the nozzle injection hole 85 is decreased gradually toward the distal end side of the nozzle 80.

Further, the proximal end of the nozzle 80 is provided to face the distal end of the movable core 52. A valve seat 86 (see FIG. 2) is formed at an end surface of the nozzle 80 outside the nozzle hole 84. The valve plug 82 described later is seated on the valve seat 86. An O-ring 83 is attached to an annular groove on the outer circumferential surface of the nozzle 80.

For example, the valve plug 82 is made of elastic material, and has a circular disk shape. The valve plug 82 is provided at the center of the distal end of the movable core 52 in a manner that the valve plug 82 and the movable core 52 move together in the axial directions. The valve plug 82 is seated on the valve seat 86 of the nozzle 80. Accordingly, the space 62 is disconnected from the nozzle hole 84.

For example, the attachment 18 is made of metal. The attachment 18 includes a cylindrical main body 88 and a flange 90 protruding outward from the proximal end of the main body 88 in the radial direction. The main body 88 is inserted into the attachment hole 14. The valve holder 28 and the nozzle 80 are partially provided inside the attachment 18 (main body 88) through a cap 92.

The main body 88 has a substantially constant outer diameter, and the main body 88 is inserted into the first hole 22 of the attachment hole 14 formed on the proximal end side of the body 12. An increased diameter portion 94 at the proximal end of the main body 88 is inserted into, and engaged with a recessed portion 96 formed at the proximal end of the first hole 22. In the structure, the attachment 18 is positioned with respect to the attachment hole 14 of the body 12 in the axial direction indicated by the arrow B.

Further, a support base 98 is formed in the increased diameter portion 94. The support base 98 is opened, and recessed on the proximal end side of the increased diameter portion 94. The elastic member 78 and the mounting member 68 are partially placed, and held inside the support base 98.

An O-ring 100 is provided around an annular groove formed on the outer circumferential surface of the main body 88, and contacts the inner circumferential surface of the first hole 22. In the structure, leakage of the fuel gas through the space between the main body 88 and the first hole 22 is prevented.

Figure 3:
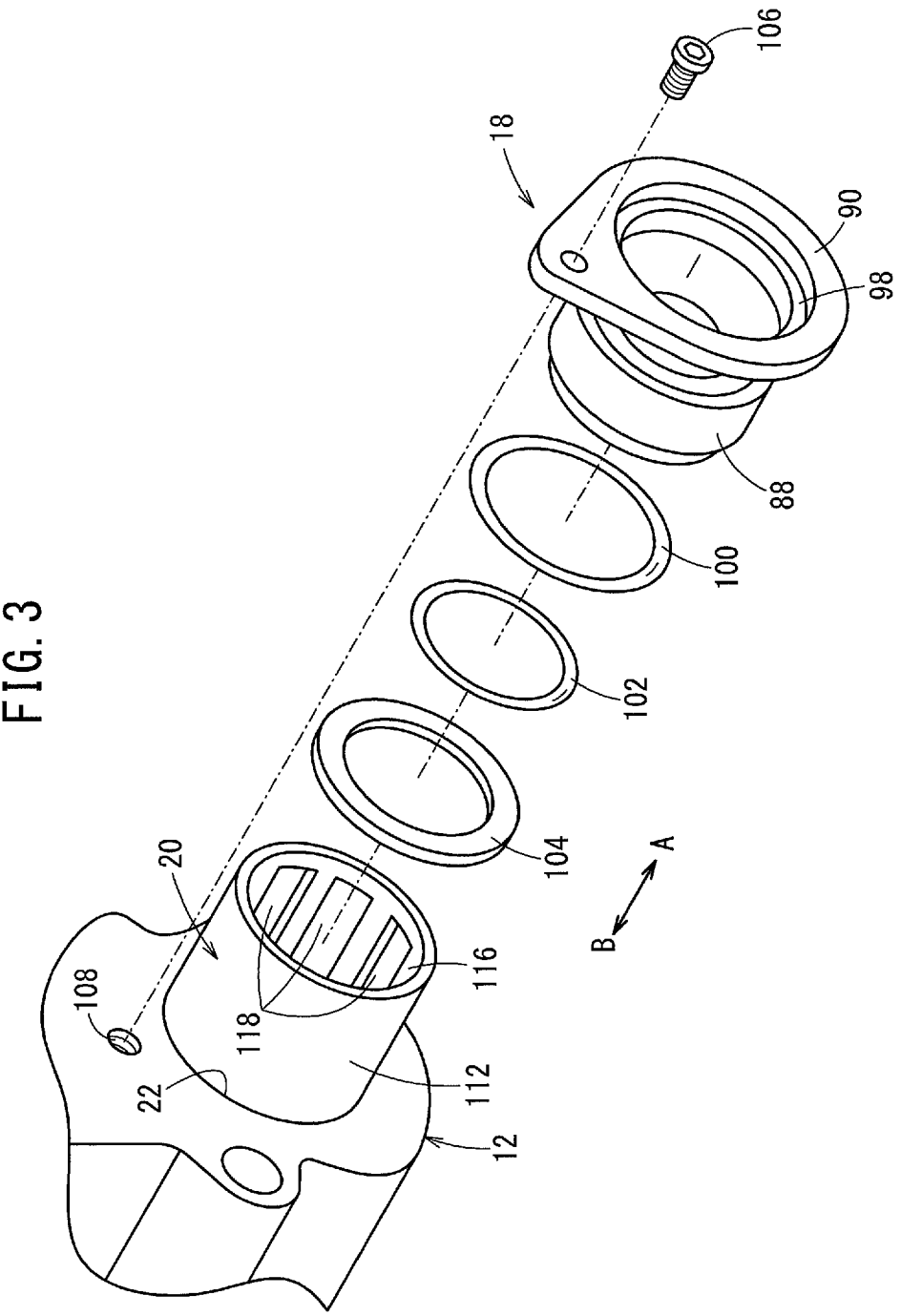
FIG. 3 is an exploded perspective view showing a state where an attachment, a ring member and an elastic member are removed from a body.

Further, as shown in FIGS. 1 to 3, the diameter at the distal end of the main body 88 is decreased stepwise, and tapered. An annular vibration absorption member (elastic member) 102 and a ring member 104 are arranged in the axial direction (the directions indicated by the arrows A and B) on the outer circumferential surface of the main body 88.

For example, the vibration absorption member 102 is an O-ring made of elastic material. The vibration absorption member 102 is provided on the proximal end side in the direction indicated by the arrow A. For example, the ring member 104 is made of metal, and provided on the distal end side of the vibration absorption member 102 in the direction indicated by the arrow B. A proximal end surface of the diffuser 20 described later contacts the distal end surface of the ring member 104 by surface to surface contact.

The flange 90 extends outward in the radial direction of the support base 98. In the state where the main body 88 is inserted into the attachment hole 14, the flange 90 contacts the proximal end surface of the body 12. Further, a mounting screw 106 is inserted into a hole formed in the flange 90, and screwed into a screw hole 108 formed at the proximal end of the body 12 to fix the attachment 18 including the flange 90 to the body 12.

In the same manner as in the case of the attachment 18, as shown in FIGS. 1 and 2, the cap 92 has a cylindrical shape. The diameter of the cap 92 is decreased at its distal end. The cap 92 covers the outer circumferential side at the distal end of the guide 64 in the valve holder 28. By an O-ring 110 provided on the outer circumferential surface of the guide 64, leakage of the fuel gas through the space between the guide 64 and the attachment 18 is prevented.

As shown in FIG. 1, for example, the diffuser 20 is made of resin. The diffuser 20 is provided in the attachment hole 14 of the body 12, on the distal end side of the injector 16 in the direction indicated by the arrow B. The diffuser 20 includes a large diameter portion 112 placed in the first hole 22 of the attachment hole 14, and a small diameter portion 114 provided on the distal end side of the large diameter portion 112. The diameter of the small diameter portion 114 is smaller than the diameter of the large diameter portion 112. A step 113 (diffuser step) is formed at the border between the large diameter portion 112 and the small diameter portion 114. Further, the small diameter portion 114 is accommodated in the second hole 24 of the attachment hole 14, and the step 113 is engaged with the stepped portion 25 to position the diffuser 20.

It should be noted that the diffuser 20 may be made of metal.

Further, a diffuser channel 115 is formed inside the diffuser 20. The diffuser channel 115 extends in the axial direction of the diffuser 20. Further, the diffuser channel 115 includes a chamber 116 formed inside the large diameter portion 112. In the chamber 116, the off gas which has not been consumed in the fuel cell stack is circulated. This chamber 116 has substantially the constant diameter. The chamber 116 is connected to a circulation channel for flowing a fuel gas discharged from the fuel cell stack through a plurality of connection channels (off gas channel) 118 extending through the outer wall of the large diameter portion 112.

This diffuser channel 115 includes a reduced diameter portion 120 and a diffuser support 122. The reduced diameter portion 120 is formed on the distal end side of the chamber 116, i.e., on the small diameter portion 114 side, and the inner diameter of the reduced diameter portion 120 is reduced sharply. The diffuser support 122 is formed downstream of the reduced diameter portion 120, and extends in the axial direction. A distal end of the nozzle 80 (nozzle injection hole 85) is positioned to face an area near the reduced diameter portion 120.

The diffuser support 122 is formed inside the small diameter portion 114, and the diameter of the diffuser support 122 is increased gradually toward its distal end. That is, the distal end side of the diffuser support 122 has the largest diameter. Further, the diffuser support 122 is connected to the second hole 24 at the distal end of the diffuser 20.

The fuel gas circulation apparatus 10 according to the embodiment of the present invention basically has the structure as described above. Next, the operation and advantageous effects thereof will be explained. The following explanation is based on the premise that hydrogen is used as the fuel gas, and the hydrogen is supplied by the fuel gas circulation apparatus 10 to the fuel cell stack (not shown). The following explanation is based on the premise that that hydrogen has been supplied to the injector 16 of the fuel gas circulation apparatus 10 beforehand through the pipe 40, and the hydrogen has been supplied to the space 62 through the gas channel 34 of the housing 26, and the passage hole 56 of the movable core 52 (valve-closed state).

Firstly, the coil 46 of the solenoid part 32 is energized based on a control signal from an electronic control unit (not shown). By excitation of the coil 46, the movable core 52 is attracted toward the fixed core 44 (in the direction indicated by the arrow A), to compress, and move the spring 60. Consequently, the valve plug 82 is spaced from the valve seat 86. That is, the valve is opened.

As a result, the hydrogen supplied to the gas channel 34 of the housing 26 flows from the space 62 to the opened nozzle hole 84 of the nozzle 80. Thereafter, the hydrogen passes through the diffuser 20, and the hydrogen is injected toward the fuel cell stack (not shown) through the second hole 24.

Then, the redundant hydrogen (hydrogen which was supplied to the fuel cell stack, but which was discharged from the fuel cell stack as the off gas without being electrolyzed in the fuel cell stack) is sucked from the connection channels 118 into the chamber 116 of the diffuser 20 through the circulation channel of the body 12 by the negative pressure which is generated when the hydrogen injected from the injector 16 passes through the reduced diameter portion 120 of the diffuser 20. The sucked hydrogen (off gas) is mixed with hydrogen injected in the diffuser 20, and then, supplied to the fuel cell stack.

In the case where supply of the hydrogen to the fuel cell stack (not shown) is sufficient, based on the control signal from the electric control unit, energization of the solenoid part 32 is stopped. As a result, the attracting force to move the movable core 52 toward the fixed core 44 (in the direction indicated by the arrow A) is lost, and the movable core 52 is biased toward the valve seat 86 (in the direction indicated by the arrow B) by the elastic force of the spring 60. Consequently, the valve plug 82 is seated on the valve seat 86, and the valve is closed. Thus, flow of the hydrogen toward the nozzle 80 is disconnected, and supply of the hydrogen to the fuel cell stack is stopped.

As described above, in the embodiment of the present invention, in the attachment hole 14 of the body 12, the vibration absorption member 102 made of elastic material is provided between the main body 88 of the attachment 18 which holds the injector 16 and the proximal end of the diffuser 20. Therefore, vibrations generated during operation of the injector 16 are absorbed suitably by the vibration absorption member 102. Consequently, with the simple structure of providing the vibration absorption member 102, transmission of vibrations of the injector 16 toward the body 12 is suppressed. It is possible to reduce noises, damages, etc. resulting from the vibrations.

Further, when the diffuser 20 is accommodated in the attachment hole 14 of the body 12, the stepped portion 25 between the first hole 22 and the second hole 24 is engaged with the step 113 of the diffuser 20. In this manner, the diffuser 20 can be positioned, and fixed easily and reliably.

Further, in the state where the diffuser 20 is placed at the distal end of the attachment hole 14, the attachment 18 is inserted from the proximal end side. In this manner, it is possible to press/hold the proximal end of the diffuser 20 at the distal end of the attachment 18 through the ring member 104 and the vibration absorption member 102.

Therefore, in the state where the diffuser 20 and the attachment 18 are assembled to the body 12, it is possible to assemble the injector 16 to the attachment 18. Accordingly, improvement in the assembling operation is achieved.

Further, even if any change has been made in the specification of the injector 16 and the diffuser 20, it is possible to handle the change by changing the attachment 18 easily. Therefore, the structure has a high versatility, and is suitable.

Moreover, by providing the metal ring member 104 adjacent to the vibration absorption member 102, even in the case where there is mismatching of the shape between the proximal end surface of the diffuser 20 and the main body 88 of the attachment 18 which face each other, it is possible to suitably bring these components into contact with each other by the ring member 104. Stated otherwise, the ring member 104 is provided between the attachment 18 and the diffuser 20. The ring member 104 functions as a spacer for closing a space between the attachment 18 and the diffuser 20.

Further, since the diffuser 20 is made of resin, it is possible to reduce the weight, and enhance productivity. Moreover, since the vibration absorption member 102 prevents application of vibrations from the injector 16, there is no concern of damages, etc.

The fuel gas circulation apparatus according to the present invention is not limited to the above described embodiment. It is a matter of course that various structures can be adopted without deviating from the gist of the present invention.

What is claimed is:

1. A fuel gas circulation apparatus comprising:
   a body;
   a fuel gas supply channel formed in the body, and connected to a fuel cell;
   an off gas channel formed in an intermediate position of the fuel gas supply channel, and configured to allow a fuel off gas discharged from the fuel cell to flow through the off gas channel;
   an injector configured to inject the fuel gas to the fuel gas supply channel;
   a diffuser provided downstream of the injector in the fuel gas supply channel, and configured to mix the fuel gas injected from the injector with the fuel off gas; and
   an attachment fixed to the body, and configured to contact the injector,
   wherein an elastic member is provided at a connection part between the injector and the diffuser,
   a ring member abuts the elastic member,
   the elastic member and the ring member are stacked in an axial direction of the attachment and the diffuser, and sandwiched and held between the attachment and the diffuser, and
   a distal end of the attachment includes a stepped portion having a reduced diameter extending axially from the distal end, and the elastic member and the ring member are arranged in the stepped portion, wherein the elastic member and the ring member do not project radially outward beyond an outer circumference of the distal end.

2. The fuel gas circulation apparatus according to claim 1, further comprising:
   a stepped channel provided between one end and another end in an axial direction of the fuel gas supply channel; and
   a diffuser step corresponding to the stepped channel provided at an outer circumference of the diffuser to contact the stepped channel,
   wherein the diffuser is sandwiched and held between the stepped channel and the attachment.

* * * * *